Feb. 23, 1954 K. G. MACLEISH 2,669,899
MONOCHROMATOR

Filed Dec. 14, 1950 3 Sheets-Sheet 1

KENNETH G. MACLEISH
Inventor

By Daniel I. Mayne
F. M. Emerson Holmes
Attorneys

Feb. 23, 1954     K. G. MACLEISH     2,669,899
MONOCHROMATOR
Filed Dec. 14, 1950                                   3 Sheets-Sheet 2
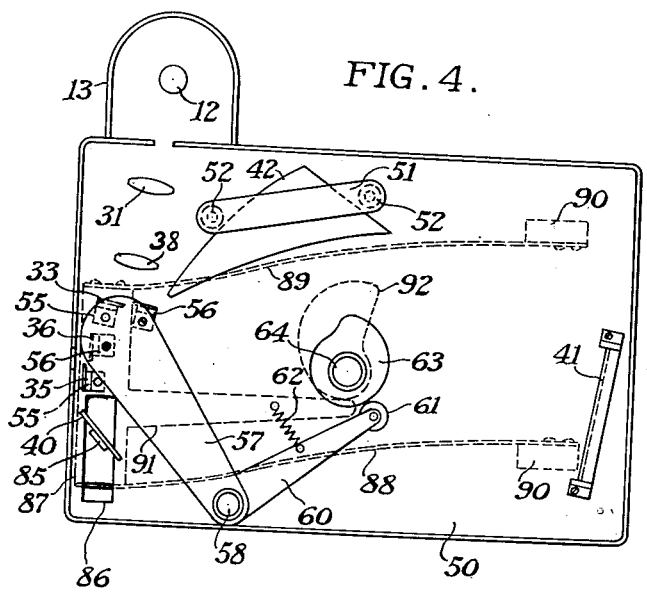
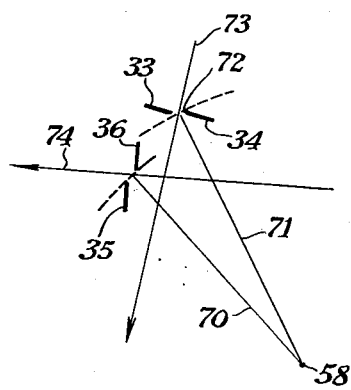
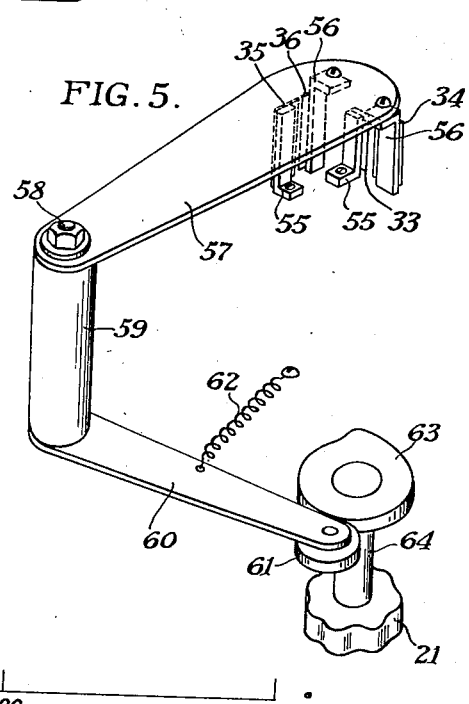
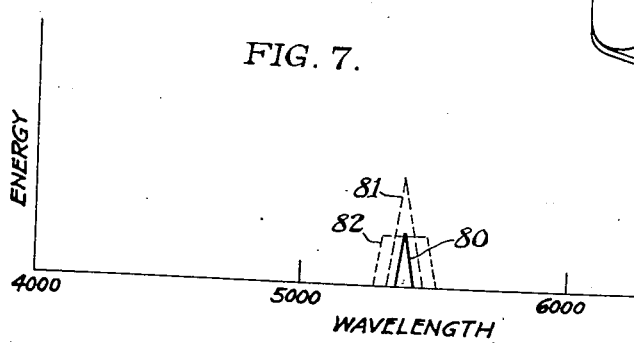
KENNETH G. MACLEISH
Inventor
By Daniel I. Mayne
F. M. Emerson Holm
Attorneys Feb. 23, 1954     K. G. MACLEISH     2,669,899
MONOCHROMATOR Filed Dec. 14, 1950

KENNETH G. MACLEISH
Inventor

By Daniel I. Mayne
F. M. Emerson Holm
Attorneys

Patented Feb. 23, 1954

2,669,899

UNITED STATES PATENT OFFICE 2,669,899

MONOCHROMATOR

Kenneth G. Macleish, Rochester, N. Y., assignor to Eastman Kodak Company, Rochester, N. Y., a corporation of New Jersey Application December 14, 1950, Serial No. 200,819

13 Claims. (Cl. 88—14)

This invention relates to monochromators which are optical instruments of the spectroscope type for producing colored light of adjustable color and usually of adjustable spectral band width. A spectrometer may be considered a form of monochromator in which an eyepiece and fiducial mark replace the exit slit of the system.

The objects of the invention are to provide a monochromator which is compact and simple in construction, convenient and accurate in its operation, and of rugged and stable design so as to remain accurate under continued usage.

Prior monochromators have taken many forms. The more common forms are described in "The Principles of Optics" by Hardy and Perrin. The present invention is particularly applicable to the Fery monochromator described on pages 556–7 of the Hardy and Perrin text and also in U. S. Patent 1,007,346, Fery. In monochromators and spectrometers there is a direct similarity between the Fery spectrograph or monochromator system and the Rowland grating system described on pages 563–565 of this same text. In both cases there is a spectrum focus circle whose diameter is equal to the radius of curvature of the front surface of the Fery prism in one case and the surface of the concave grating in the other. The center of curvature of the refracting or reflecting surface falls on this focus circle. In the case of the prism the center of curvature of the rear surface, which is the reflecting one, is also on the focus circle. The present invention includes a number of features which are applicable to either system, that is, to any monochromator of the type having a reflecting spectral dispersing element. Concave gratings have certain disadvantages such as overlapping orders of spectra as compared with spherical reflecting prisms. Therefore the present invention is described particularly with reference to the prism system, but it is to be understood that the principles thereof are applicable to concave gratings.

One feature of monochromators of this general type is the slight distortion of the lines of the spectrum. The normal procedure to overcome this distortion or to compensate for it is to have either the entrance slit or the exit slit curved slightly. Because of this slight curvature, one cannot state that both slits are strictly straight, but the curvature is very slight and with this possible refinement in mind, the slits can be described as being substantially perpendicular to the plane of dispersion of the reflecting element. Prior instruments did not, however, correct for astigmatism introduced by spherical reflecting dispersing elements. One of the objects and advantages of the present invention is the reduction or elimination of astigmatism introduced in this way. With both distortion and astigmatism minimized, an extremely efficient instrument results.

Thus the present invention may be considered primarily as an improvement in Fery monochromators, that is in monochromators which have entrance and exit slits and spherical reflecting spectral dispersing elements, preferably prisms.

According to the invention a monochromator of this general type is made up with fixed entrance and exit slits and a fixed prism, or other simple or complex unit for dispersing and focusing light. These three elements are rigidly attached to a support. That is, they are rigidly attached to the support during operation of the instrument but are in general adjustable during manufacture to insure proper calibration of the instrument. Also the slits are usually of adjustable width and are fixed relative to the optical system by having one jaw of each slit rigidly attached to the support and the other one movable. Such slits are said to be fixed since the change in slit width is very small compared to the distance across the visible spectrum. In the present invention spectral selection is provided by means of a plane reflector associated with one of the slits and movable so as to move a virtual image of that slit along the focus circle of the monochromator.

The advantages of having the slits and prism all fixed relative to one another are simplicity of construction, ruggedness and stability of operation and the possibility of using the simplified slit construction described below. This latter possibility depends on the number of reflections in the optical system between the focusing means and the two slits; between one slit and the focusing means, there should be one more reflection than between the other slit and the focusing means. This general feature of fixed slits and a fixed prism also ties in with the simplicity of the device for correcting astigmatism, namely the cylindrical mirror of constant curvature to be discussed below.

In most commercial uses of monochromators, extreme accuracy is not necessary and the present invention lends itself particularly well to the design of an inexpensive but completely adequate commercial instrument.

The mounting of the movable plane reflector may take any form which causes the virtual image of the associated slit to move approximately along the spectrum focus circle of the monochromator. One preferred mounting which provides simplicity, ruggedness, stability and convenience of coupling to the slit width adjusting mechanism is constructed as follows. Two metal springs or ribbons of equal length are arranged parallel to each other and rigidly attached at one end of each ribbon to the support. A single rigid member carrying the plane reflector is attached to the other ends of both ribbons, and is movable in the plane of dispersion of the dispersing element. The rigid movable member is provided with a cam follower located approximately at a point in the plane which is equidistant (measured perpendicularly) from the four ends of the ribbons. Adjustment is provided by a cam which engages this cam follower and which moves the rigid member and the plane reflector transversely and without rotation.

Another feature of a preferred embodiment of the invention consists of a cylindrical mirror optically between the slits and the dispersing focusing element, with its cylindrical axis in the plane of dispersion. This arrangement reduces the astigmatism introduced by the obliquity at which the light is incident on the spherical reflecting member and, if the curvature of the mirror is appropriately selected, the astigmatism is reduced to a minimum practically to zero throughout the spectrum. This cylindrical mirror which forms a virtual image of the prism or other dispersing member on the spectrum focus circle of monochromator also contributes to the compactness of the instrument. When this cylindrical mirror is used the prism can be much smaller in the direction perpendicular to the plane of dispersion; this reduces cost as well as bulkiness to a minimum.

A third special feature of preferred embodiments of the invention is related to the slit construction for providing adjustable band width. It is preferable in monochromators to adjust both slit widths simultaneously, and by substantially or effectively equal amounts. This results in an energy distribution in the spectral band from the instrument which is substantially triangular in form being a maximum approximately at the center of the spectral band, and falling off to zero at both sides of the band. In prior instruments in which one of the slits is movable, it is not convenient to have simultaneous adjustment of the slit widths. The same is true of instruments which have the slits at some distance from each other. If the light is not reflected at all between the dispersing member and the slits or is reflected the same number of times in both the entrance beam and exit beam, the adjustment of the slits is less convenient because it is necessary to move the two adjacent jaws of the slits or the two outside jaws and to move them in opposite directions. The selection of which jaw moves, depends on the focusing arrangement since it is preferable to have the entrance slit focused precisely on the exit slit, one edge of the entrance slit being focused on one edge of the exit slit for some particular wavelength of light. The movable jaws should therefore move so as to stay conjugate to one another for some particular wavelength. According to a preferred embodiment of the present invention these advantages are obtained by having one jaw of each slit rigidly attached to the monochromator support and the other jaw of each slit rigidly attached to a single member pivoted at a distance from the slits so that slight rotation of this member adjusts both slit widths simultaneously. The position of the pivot is selected to maintain the movable jaws conjugate to one another and approximately to insure that the degree of adjustment of both slits is effectively the same. This latter requirement is not too critical since it affects only the distribution of energy in the spectral band emitted and this is already affected somewhat by the residual aberrations of the system.

Finally a feature of the preferred embodiment of the invention involves a coupling of the slit adjusting mechanism to the spectral adjustment mechanism so that the spectral width of the emergent band remains constant for all settings of the spectral selecting device. In the preferred embodiment of the invention this feature of constant band width holds only for one particular band width and, at the same time, the spectral calibration of the instrument is linear. Alternatively the constant band width feature can be operated at two or more band widths and in this case the spectral calibration is nonlinear.

Other objects and advantages of the invention will be apparent from the following description when read in connection with the accompanying drawings in which:

Fig. 4 is similar to Fig. 2 and includes the adjusting mechanisms of the instrument;

Fig. 5 is a perspective view of the slit adjusting mechanism;

Fig. 6 is a diagram to illustrate the operation of the mechanism shown in Fig. 5;

Figure 8:
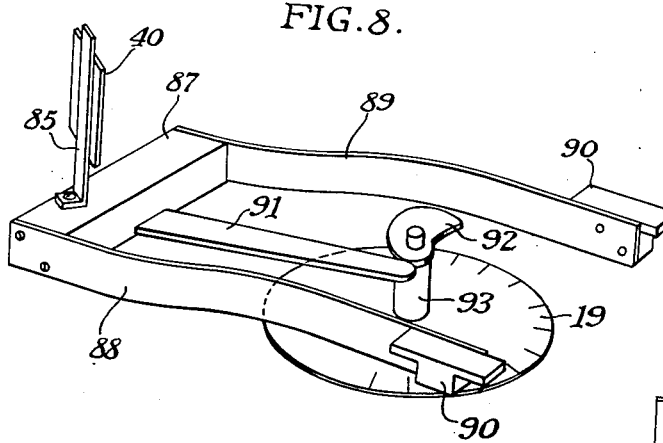
Figure 9:
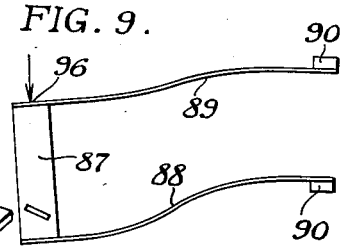
Figure 10:
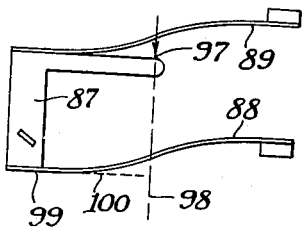
Figure 11:
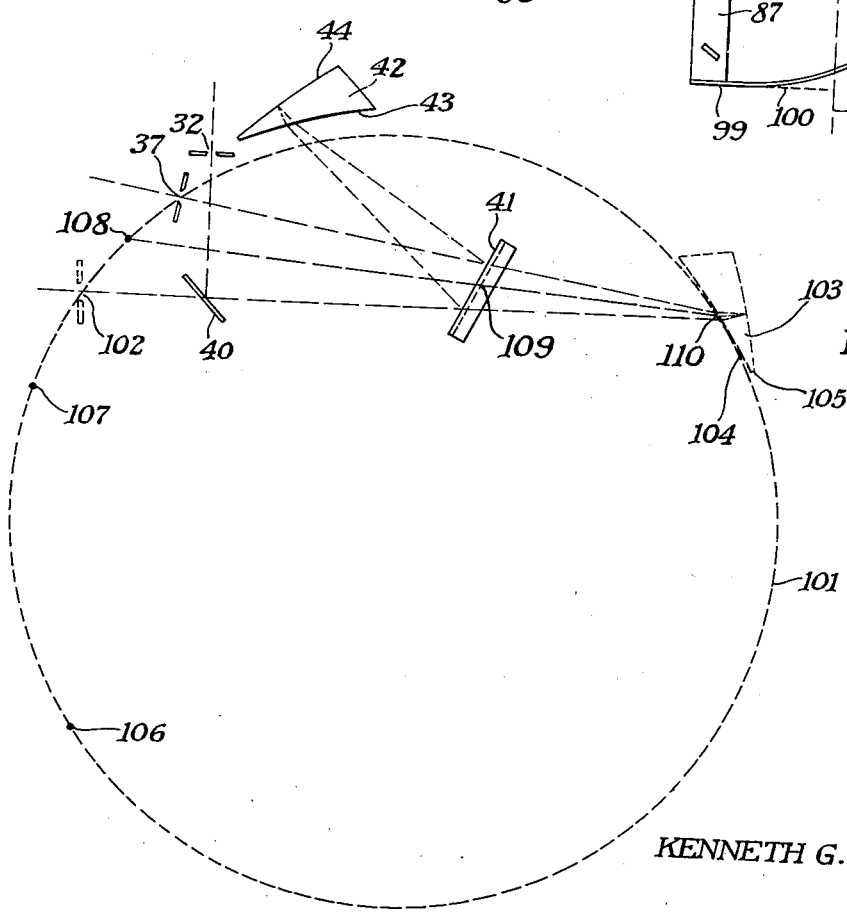

Fig. 7 graphically illustrates the spectral output of the monochromator;

Fig. 8 is a perspective view of the spectral adjusting mechanism;

Figs. 9 and 10 are diagrams to illustrate the operation of the mechanism shown in Fig. 8;

Fig. 11 is a diagram to illustrate the principles of the optical system.

Figure 1:
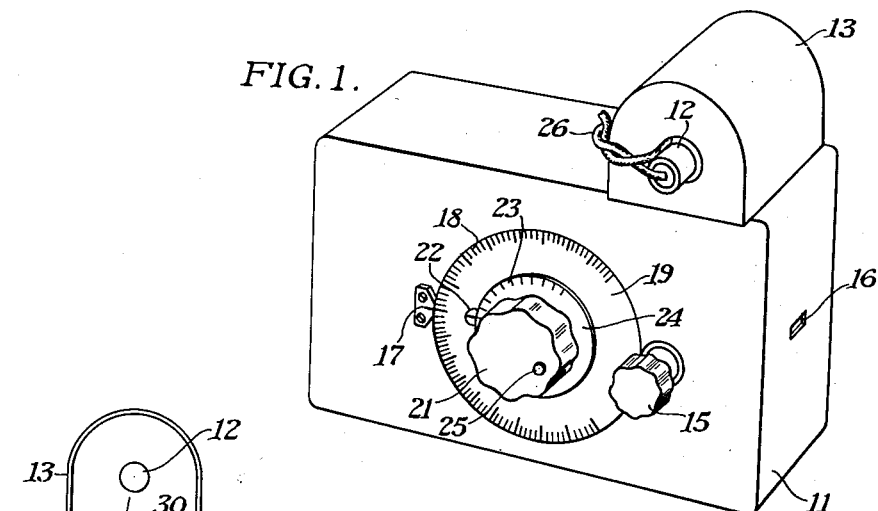
Fig. 1 is a perspective view of a monochromator according to the preferred embodiment of the invention.

In Fig. 1 a monochromator according to the invention consists of a housing 11 on which is mounted a light source 12 in a separate housing 13. The light from the source passes through the system and is dispersed to form a spectrum, a part of which is selected, by turning knob 15, and this part then emerges from a window 16 in the housing. The wavelength of the emerging light, specifically the wavelength at the center of the band is indicated by index 17 and scale 18 which is mounted on a disk 19 which is rotated by the knob 15. The entrance and exit slits of the monochromator are coupled to be adjusted simultaneously. This adjustment is provided by turning a knob 21 and the width of both slits is read by an index 22 and a scale 23 carried on a disk 24 which is turned by the knob 21.

For one setting of the slit width, for example that which corresponds to a spectral band half width of 100 Å, the knob 21 may be rigidly attached by screw 25 to the disk 19. Rotation of the knob 15 (or knob 21) then changes the wavelength as indicated by the scale 18 and the slit width as indicated by the scale 23 simultaneously so that the band width in angstrom units remains constant. In this instrument the wavelength scale 18 is linear and the constant band width feature holds only for one particular band width. Both adjustments involve rotary cams and if the cam rotated by the knob 21 is chosen so as to give the constant band width feature for several different band widths and then the cam operated by the knob 15 is correspondingly modified, the wavelength scale 18 no longer would be linear. The lamp 12 is a small 37½ watt 5 volt lamp of standard sound reproduction type and receives its power from an ordinary 5 volt transformer (not shown) through wires 26.

Figure 2:
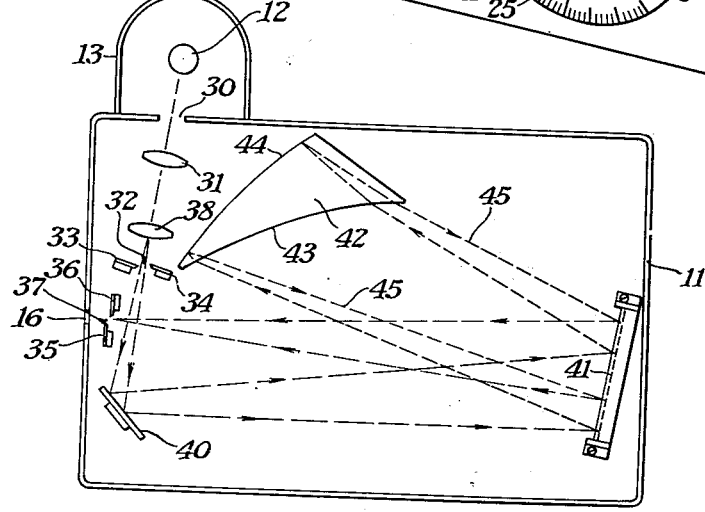
Fig. 2 is a rear elevation of the device shown in Fig. 1 with the cover removed.

The essential features of the optical system are shown in Fig. 2. It should be noted that the plane of dispersion is vertical if this view is considered an elevation; in considering the optics however and particularly in comparison with other monochromators it is customary to refer to the plane of dispersion as horizontal. Light from the lamp 12 passing through a window 30 in the housing 11 is focused by condenser lens 31 on an entrance slit 32 having jaws 33 and 34. Jaw 34 is adjustable simultaneously with one of the jaws (namely 36) of the exit slit 37 of the instrument. A field lens 38 is included for focusing the condenser lens 31 on the objective of the whole system which in this case is a concave reflecting prism 42 to be described below. Light from the slit 32 is reflected by a plane reflector 40 to a cylindrically concave reflector 41 whose cylindrical axis lies in the plane of the drawing. This cylindrical mirror 41 reflects the light to a spherically curved reflecting prism 42 whose front surface 43 refracts and disperses the light spectrally and whose rear surface 44 is provided with a metallic coating to reflect and focus the light. The reflected and dispersed light as indicated by the rays 45 strikes the mirror 41 again and is brought to focus on the exit slit 37. The rays shown by broken lines in Fig. 2 are for one particular wavelength. If white light from the slit 32 is reflected by the mirrors 40 and 41 to the prism, the returning light from the prism 42 is focused to form a spectrum along a locus which passes through the slit 37. Adjustment of the mirror 40 parallel to itself moves this spectrum locus transversely across the slit 37 so that any desired wavelength may be selected.

Figure 3:
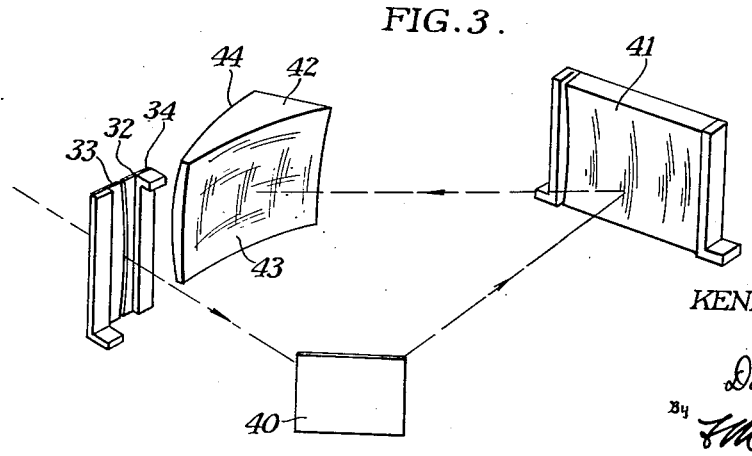
Fig. 3 is a perspective view of part of the optical system.

As shown in Fig. 3 the entrance slit 32 is actually slightly curved; the curvature is greatly exaggerated in Fig. 3. The purpose of this slight curvature is well known in monochromators namely to compensate for the prismatic distortion. For most purposes this slit may be considered straight and to the degree that it approximates a straight line, it is substantially perpendicular to the plane of dispersion of the prism 42. Either the entrance slit or the exit slit, or both of them, may be curved. This curvature is not an essential feature of the present invention. The cylindrical curvature of the mirror 41 is also apparent from Fig. 3. It will be noted that the front surface 43 of the prism 42 has longer radius of curvature than the rear surface 44.

Fig. 4 is similar to Fig. 2 but shows some of the mounts and adjusting mechanisms for the optical parts of the instrument. The prism 42 is rigidly attached to the support 50 by a cross bar 51 and two screws 52. The term "rigidly attached" includes those elements for which manufacturing adjustment is permitted. In the case of the prism 42 it is customary to provide an abutment, not shown, on the support 50 (with or without set screws or shims) for final critical manufacturing adjustment of the prism. As far as the present invention is concerned this prism is rigidly attached to the support 50. Alternatively and in some respects more conveniently, the prism is fixed and then the mirror 41 is adjusted during manufacture to correct for any slight misalignment of the prism.

The slit adjusting mechanism is shown in Figs. 4 and 5. The jaws 33 and 35 are rigidly attached to the support 50 by posts 55. The other jaws of each slit namely 34 and 36 are coupled together and rigidly attached by posts 56 to a pivoted member 57 which is pivoted at the point 58 some distance from the slits. Rotation of the member 57 about the pivot 58 is provided through a post 59 by rotation of a lever arm 60 which carries a cam follower 61 spring urged by a spring 62 against a rotary cam 63 which is rotated through a shaft 64 by the knob 21 shown in Fig. 1.

Reference to Fig. 6 indicates the geometry of this slit adjustment. The ideal situation or at least one ideal situation would have both slits (or more exactly one slit and the virtual image of the other in reflector 40) lying flush with the focus circle for all settings of the slit width. In such case, the fixed jaws would have their edges effectively on the circle and the edges of the movable jaws would move effectively along the circle. It would also be ideal to have both jaws remain effectively equal in width to each other for all settings of the adjustment but this is not too important and the present system only approximates this latter condition. The first condition allows for some modification too. The important point is to have the moving jaws remain conjugate to each other, i.e. remain focused on each other. Thus one jaw may move off the focus circle if the other movable one simultaneously moves off the circle in the proper direction to compensate for the off circle movement of the first jaw. This is a more general ideal and is the one accomplished by the arrangement shown. The jaws 36 and 34 move along the broken lines shown in Fig. 6, the critical part of the jaw being the slit edge, e. g. edge 72 in the case of jaw 34. For these motions both to be on the focus circle the pivot point 58 would have to be on the opposite side of the slits and outside the instrument as shown. However, pivot 58 as shown is such that the motions are along conjugate focal lines with respect to the image forming system which in this case is primarily the prism 42. Since the pivot radius 71 is greater than 70 and since the angle between the motion of jaw 34 and the plane transverse to the light beam 73 is less than the corresponding angle between the motion of 36 and plane transverse to 74, the effective change in width of the entrance slit is slightly greater than that for the exit slit, but this slight difference is inconsequential.

Fig. 7 illustrates by curve 80 the energy distribution in the emergent light when the entrance and exit slits are effectively of equal width. The energy is a maximum at the center and falls off to zero at the edges of this band. A simultaneous increase in both the entrance and exit slit widths merely raises the curve to the position 81, increasing the total energy by the square of the slit width and increasing the band width uniformly on both sides of the peak. If the entrance slit is held at constant width and the exit slit is increased a curve such as 82 results. If the exit slit is held constant and the entrance slit is increased in width, a similar curve 82 results. Slight deviations from purely triangular distribution such as curve 80 are inconsequential in most practical uses of monochromators. Also other aberrations tend to produce such deviations anyway, so there is no point in striving for absolute equality of slit width. The wavelength scale is here shown linearly; in practice, a spectrum from 380 millimicrons to 700 millimicrons is so distributed on a circular arc that the mid point of the arc is at 464 millimicrons. On a linear scale therefore, the triangle 80 is tipped slightly from the erect isosceles position but the distinction is extremely slight.

Fig. 4 and Fig. 8 show the mechanism for adjusting the movable plane reflector 40. This reflector 40 is carried by a post 85 extending through an aperture 86 in the support 50. This post 85 is rigidly attached to a rigid member 87 whose ends are fastened to resilient metal ribbons or springs 88 and 89. The ribbons are of the same length and are attached at their other ends rigidly to the support 50 by the studs 90. These spring members 88 and 89 are below the support 50 in Fig. 4. The rigid member 87 is provided with an arm 91 extending toward the plane which is midway between the ends of the springs 88 and 89 and this arm 91 constitutes a cam follower substantially in that plane. The cam follower engages a rotary cam 92 rigidly attached through a sleeve 93 to the disc 19 which is rotated by the knob 15. The cam 92 may be on either side of the arm 91 and if a linear wave length scale on the disc 19 is desired the cam should be shaped accordingly, i. e. should be steeper at the blue end of the spectrum. The cam shown is symbolic only; the exact shape is one with radii directly proportional to the spectral variation in index of refraction of the prism used.

This spring mounting of the movable mirror 40 provides accurate but simple and convenient means for moving the mirror transversely without rotation. Theoretically even a single spring in either the position shown at 88 or the position shown at 89 should provide motion of translation without rotation, but such a system would be quite sensitive to error. The double spring construction is particularly rugged and stable however.

Figs. 9 and 10 illustrate the principle of the mechanism just discussed. If the arrangement were that shown in Fig. 9, wherein adjustment of the system is provided by pressure exerted at the point 96 indicated by an arrow, the spring 89 would tend to remain straighter than the spring 88 and the member 87 would be rotated slightly as shown. However, if the pressure is exerted at a point 97 as shown in Fig. 10 which point 97 is approximately in the plane 98 equidistant from the ends of the springs 88 and 89, the tendency to rotate the member 87 is practically eliminated, at least for all first and second order factors. The distance of a plane such as 98 from a point such as 99 which is the effective end of the resilient ribbon 88, is of course measured perpendicularly as indicated by the perpendicular 100. This arrangement is not absolutely critical and the fact that the pressure point 97 may and usually does move slightly out of the midway plane, does not introduce any appreciable error. The pressure point need be only approximately in the plane in question.

The principle of operation of this specific embodiment will now be described with reference to Fig. 11. The focal circle 101 with a radius of curvature of 258.7 mm. passes through the exit slit 37, through a virtual image 102 of the entrance slit 32 as formed by the reflector 40 and through the point 110 of the front surface 104 of the virtual image 103 of prism 42 formed by the cylindrical mirror 41. In practice the surface 43 of the prism 42 may conveniently be also on the circle 101, but to indicate that the actual position of the prism 42 is not critical, it has been shown spaced from the circle 101. A standard Fery monochromator would have an entrance slit 102, a prism at 103 and an exit slit at 37. The movable mirror 40 and the cylindrical mirror 41 constitute features added in accordance with the present invention.

The surface 104 has its center of curvature at the point 106 on the circle 101 diametrically opposite the prism position 103. The rear surface 105 also has its center of curvature 107 on the circle 101.

Radius of curvature of surface $104 = R_1 = 517.4$ mm.
Radius of curvature of surface $105 = R_2 = 469.1$ mm.
The prism angle between surfaces 104 and 105 $= A = 30°$.
Effective thickness of the prism 103 at point $110 = t = 21$ mm.
this is arbitrarily selected to give a convenient size prism.

The decision as to where to place the various components on the focal circle 101 is not critical. In this particular case a prism at the point 110 would give minimum deviation to light of wavelength 464 millimicrons coming from the point 108 and returning to the point 108 after reflection by the prism 103. To avoid physical interference of the parts, the exit slit 37 is arbitrarily placed at some distance along the circle 101 from the point 108. For light of wavelength 464 mu, the entrance slit must effectively be at a point 102, an equal distance on the other side of point 108. It happens that the angle of incidence of a ray from a point 108 to the point 110 on the surface $104 = I_0 = 54$ degrees 57 minutes.

Movement of the mirror 40 parallel to itself moves the entrance slit 102 along a tangent to the circle 101, which approximates motion along the circle itself. The actual entrance slit 32 is also on this tangent. Motion of the jaws which constitute the slit so as to remain in proper focus has been fully described above in connection with Figs. 4, 5 and 6. Either the entrance slit or the exit slit may be the one on the circle 101 and the other slit will then have a virtual image on the circle 101. In either case motion of the movable mirror causes the spectrum, which lies along the circle 101 to move along this circle and transversely to the exit slit.

The cylindrical mirror 109 is curved with its axis lying on the plane of Fig. 11. Any reasonable concave curvature reduces the astigmatism introduced by the obliquity at which the rays strike the prism 42. For maximum reduction of astigmatism this surface should have a radius of curvature equal to $$\frac{2U}{D}(U+D) \cos B$$

where $U =$ the distance 108 to 109 of the mirror 41 from the point 108, $B =$ the angle of incidence of the ray from 108 on the mirror 41 and $D = R_1 \sin I_0 \tan (I_0 - A)$ as defined above
$= 517.4 \sin 54° 57' \tan 24° 57'$ in the example given
$= 197.1$ mm.

Also, in the above example $U=185.8$ mm., $B=7\frac{1}{2}°$ and the cylindrical radius of curvature of the mirror $4f=715.7$ mm.; any mirror with approximately this radius is satisfactory.

Having thus described the preferred embodiment of my invention, I wish to point out that it is not limited to the specific structure shown and is of the scope of the appended claims.

I claim:

1. A monochromator of the reflecting dispersing prism type, comprising a support, a spherically curved reflecting dispersing prism rigidly mounted on the support for receiving light from a line substantially perpendicular to the plane of dispersion and for forming a focused spectrum intersecting said plane substantially along the arc of a circle which passes through said line, a concave cylindrical mirror with its cylindrical axis parallel to said plane rigidly mounted on the support and oriented to reflect light from said line to the prism and to reflect spectrally dispersed light from the prism to said spectrum, entrance and exit slit defining means of adjustable slit width mounted in fixed position on the support with the slits substantially perpendicular to said plane with both slits effectively on said circle at least one of them by having a virtual image thereof on said circle, the entrance slit being effectively at said line and the exit slit being effectively at a point on said arc, a plane reflector for forming on said circle said virtual image of one of the slits, means on said support for moving the plane reflector so as to move said virtual image substantially along said circle and means for illuminating and sending light through said entrance slit.

2. A monochromator according to claim 1 in which the plane reflector moving means includes two spaced parallel resilient metal ribbons of equal length each rigidly attached at one end to said support, a rigid member carrying the plane reflector and attached to the other ends of both ribbons, a cam follower carried by said rigid member approximately at a point in the plane which is equidistant from the ends of the ribbons and a rotary cam rotatably mounted on said support and engaging said cam follower.

3. A monochromator according to claim 1, in which each slit defining means has a fixed jaw rigidly mounted on the support and a movable jaw movable to and from the fixed jaw for adjusting the slit width and which includes a member rigidly carrying both movable jaws and means for rotating said member through a small angle about a pivot to adjust both slit widths simultaneously and by approximating equal amounts relative to the effective width of the light beams through the slits.

4. An optical system for a monochromator comprising entrance slit defining means, exit slit defining means, a spherically curved reflecting dispersing prism and a concave cylindrical mirror all fixedly mounted relative to one another and a plane reflector for forming a virtual image of one of the slits, the plane reflector and the slits all being substantially perpendicular to the plane of dispersion of the prism, the cylindrical axis of the mirror being parallel to said plane to reduce astigmatism introduced by the prism, said virtual image, the cylindrical mirror, the prism, the cylindrical mirror again and the other slit itself all being optically aligned in the order named, said virtual image, said other slit and the virtual image of the prism in the cylindrical mirror all being substantially on the circle which includes the arc on which the prism forms a focused spectrum of a line also on said circle, the plane reflector being oriented approximately radially to said circle, and means for moving said plane reflector substantially parallel to itself to move said virtual image of one of the slits substantially along said circle.

5. A monochromator of the reflecting, spectral-dispersing-element type comprising a support, entrance and exit slit defining means fixedly mounted on said support and means including a reflecting spectral-dispersing element rigidly mounted on the support, for receiving light from the entrance slit and for focusing a spectrum along a locus at and transverse to the exit slit, the slits being substantially perpendicular to the plane of dispersion of the element and a movable plane reflector also substantially perpendicular to said plane of dispersion optically aligned to reflect the light once between the element and one only of the slits, means on said support for moving the plane reflector parallel to itself to move said spectrum transversely across the exit slit and means for illuminating and sending light through said entrance slit.

6. A monochromator according to claim 5 in which the plane reflector moving means includes two spaced parallel resilient metal ribbons of equal length each rigidly attached at one end to said support, a rigid member carrying the plane reflector and attached to the other ends of both ribbons, a cam follower carried by said rigid member approximately at a point in the plane which is equidistant from the ends of the ribbons and a rotary cam rotatably mounted on said support and engaging said cam follower.

7. A monochromator according to claim 5 in which each slit defining means has a fixed jaw rigidly mounted on the support and a movable jaw movable to and from the fixed jaw for adjusting the slit width and which includes a member rigidly carrying both movable jaws and means for rotating said member through a small angle about a pivot to adjust both slit widths simultaneously and by approximately equal amounts relative to the effective width of the light beams through the slits.

8. A monochromator according to claim 5 in which the spectrum focusing means comprises as the reflecting spectral-dispersing element a spherically curved reflecting element and includes a concave cylindrical mirror with its cylindrical axis parallel to said plane rigidly mounted on said support aligned both to reflect light from the entrance slit to the element and to reflect spectrally dispersed light from the element to said locus, the movable plane reflector being optically aligned between one of the slits and the concave cylindrical mirror.

9. An optical system for a monochromator comprising entrance and exit slit defining means and means including a plane reflector and a reflecting spectral-dispersing element for receiving light from the entrance slit for reflecting it once only at said plane reflector and for focusing a spectrum along a locus at and transverse to the exit slit, the slit defining means and said element all being fixedly mounted relative to one another with the slits substantially perpendicular to the plane of dispersion of the element, means for supporting the plane reflector also perpendicular to the plane of dispersion and for moving it parallel to itself to move said spectrum transversely across the exit slit.

10. An optical system according to claim 9 in which the spectrum focusing means comprises as the reflecting spectral-dispersing element a spherically curved reflecting element and includes a concave cylindrical mirror with its cylindrical axis parallel to said plane rigidly mounted on said support aligned both to reflect light from the entrance slit to the element and to reflect spectrally dispersed light from the element to said locus, the movable plane reflector being optically aligned between one of the slits and the concave cylindrical mirror.

11. An optical system for use in a monochromator comprising a spherically curved reflecting spectral-dispersing element rigidly mounted on a support, entrance and exit slit defining means and a concave cylindrical mirror all rigidly mounted on the same support with the cylindrical axis of the mirror parallel to the plane of dispersion of the element and oriented to receive light effectively from the entrance slit and to reflect it to the element and also to receive this light again after reflection and dispersion by the element and to reflect the dispersed light into focus as a spectrum effectively at the exit slit.

12. An optical system according to claim 11 in which said element is a spherically curved reflecting prism.

13. A monochromator comprising a support, entrance and exit slit-defining means fixedly mounted on said support, an optical system including a spectral-dispersing element for receiving light from the entrance slit and for focusing a spectrum along a locus at and transverse to the exit slit, the slits being substantially perpendicular to the plane of dispersion of the element and a movable plane reflector also substantially perpendicular to said plane of dispersion optically aligned to reflect the light once between the element and one only of the slits, a mount for moving the plane reflector parallel to itself to move said spectrum transversely across the exit slit, said mount consisting of two spaced parallel resilient metal ribbons of equal length each rigidly attached at one end to said support, a rigid member carrying the plane reflector and attached to the other ends of both ribbons, a cam follower carried by said rigid member approximately at a point in the plane which is equidistant from the ends of the ribbons, a rotary cam rotatably mounted on said support and engaging said cam follower, and means for illuminating and sending light through said entrance slit.

KENNETH G. MACLEISH.

References Cited in the file of this patent

UNITED STATES PATENTS

| Number | Name | Date |
|---|---|---|
| 617,684 | Friez | Jan. 10, 1899 |
| 1,281,926 | Fecker | Oct. 15, 1918 |
| 1,399,743 | Brody | Dec. 13, 1921 |
| 1,711,768 | Bausch et al. | May 7, 1929 |
| 1,711,909 | Stalcup | May 7, 1929 |
| 2,021,232 | Fassin | Nov. 19, 1935 |
| 2,305,778 | Hansen | Dec. 22, 1942 |
| 2,408,512 | Gradisar | Oct. 1, 1946 |
| 2,453,164 | Swings | Nov. 9, 1948 |
| 2,499,322 | Mather et al. | Feb. 28, 1950 |
| 2,504,949 | Foufounis | Apr. 25, 1950 |
| 2,548,548 | Menzies et al. | Apr. 10, 1951 |
| 2,587,451 | Farrand | Feb. 26, 1952 |
| 2,594,334 | Miller | Apr. 29, 1952 |

FOREIGN PATENTS

| Number | Country | Date |
|---|---|---|
| 550,932 | Great Britain | Feb. 1, 1943 |